Oct. 18, 1938.  W. L. GERRANS, JR  2,133,442
TRAY LOADING DEVICE
Filed Sept. 24, 1936
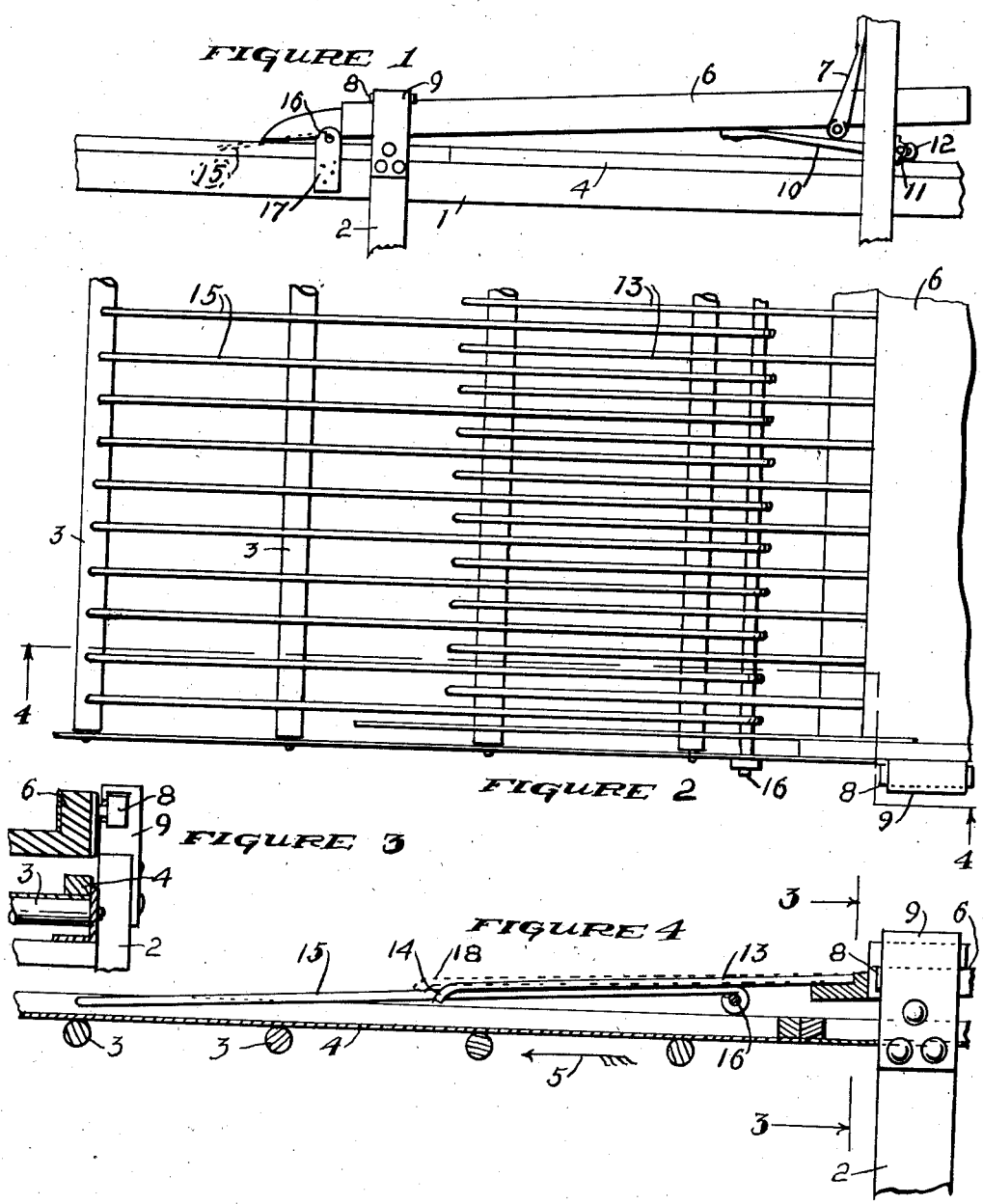
INVENTOR
William L. Gerrans, Jr.
John A. Naismith
ATTORNEY Patented Oct. 18, 1938

2,133,442

UNITED STATES PATENT OFFICE 2,133,442

TRAY LOADING DEVICE

William L. Gerrans, Jr., Santa Clara County, Calif.

Application September 24, 1936, Serial No. 102,343

1 Claim. (Cl. 214—1)

The present invention as hereinafter described relates particularly to means to smoothly and evenly distribute objects, such as prunes, over a tray, such as a drying tray.

In the prune drying industry it is common practice to feed the processed prunes down an inclined chute to a drying tray passing under its discharge end. The chute is subjected to a shaking movement which causes the fruit to roll and jump down the incline, but since all of the fruit receives the same treatment from the time it enters the chute until it is discharged therefrom it does not reach the discharge end in a closely packed formation but rather loosely. Since the tray is moving continuously and at a uniform rate of speed it follows that the prunes are distributed thereon unequally, that is they may be packed closely together on one part of the tray and quite scattered on another part, necessitating proper filling by hand.

It is the object of the present invention to provide means whereby the prunes, or other objects, may be closely and uniformly distributed over the tray as they are placed thereon.

It is also an object of the invention to provide means of the character indicated that will be economical to manufacture, simple in form and construction, that consists of few parts, and that will be strong, durable, and highly efficient in its practical application.

In the drawing:

Figure 1 is a side elevation of a portion of a structure embodying my invention.

Figure 2 is a greatly enlarged plan view of a device embodying my invention.

Figure 3 is a sectional view on line 3—3 of Figure 4.

Figure 4 is a sectional view on line 4—4 of Figure 2.

In the particular embodiment of the invention herein disclosed I show at 1 and 2 portions of the general framework carrying rollers 3 over which the trays 4 are moved by means not shown, the said trays moving in the direction indicated by arrow 5.

The chute down which the fruit passes is shown at 6. The upper end of the chute is supported on flexible hangers as at 7, while the lower or discharge end is supported by shoes as at 8 slidably mounted in a guide or support 9 on framework 2. The shaker-chute is actuated by a flexible pitman 10 eccentrically mounted on a drive shaft 11 as at 12. The result of this construction is that when the drive shaft is in operation the upper portion of the chute 6 is subjected to a shaking movement in the ordinary manner for such devices, but the lower end of the chute has only a reciprocating sliding movement, the shaking movement being most pronounced at the point of the hanger and gradually diminishing as the sliding support is approached.

Mounted upon and projecting forwardly from the discharge end of the chute 6 and in the present case lying in the plane thereof, are a number of laterally spaced rods as 13, these rods terminating in downwardly turned ends as indicated at 14.

At 15 are shown a number of similar rods mounted on a cross-bar 16 which is in turn mounted on brackets as at 17 on frame 1. In the present instance these rods lie substantially in the plane of rods 13 and are arranged alternately with respect thereto. The rods 15 extend forwardly of rods 13 a sufficient distance to carry them into the underlying tray, and the bar 16 which supports the upper ends of the rods is disposed just forward of the discharge end of the chute so that the two sets of rods may be brought into substantially the same plane when the chute is in a retracted position.

When the device is in operation the prunes start on their journey down the chute in the usual manner, the operation of this upper end of the shaker-chute serving to propel the fruit by applying a rapid series of short forwardly directed impulses thereto. But as the fruit advances this movement gradually changes to a sliding movement so that when the fruit reaches the rods 13 it is not tossed about but moves smoothly down the said rods and the rods 15 to the tray.

The sliding movement of the prunes as they pass down over the rods 13 tends to bring them closer together as they pass on to the rods 15, and this tendency to crowd is mechanically encouraged by the movement of rods 13 relative to rods 15.

It may be assumed that the rods 13 are in the position shown in solid lines in Figure 4 when the chute 6 is in a retracted position, but when the chute is advanced the rods 13 advance as a unit therewith and assume some such position as indicated in dotted lines at 18, the rods 15 of course remaining stationary. The result of this action is that as the prunes slide off of the rods 13 and on to the rods 15 they are nudged or pushed forwardly into a compact formation, and laid upon the tray as closely as though arranged by hand.

Since the rods 15 are stationary the prunes must be pushed thereover, and the effect of this is that the foremost prunes, through frictional contact with the rods 15, offer some resistance to the advance of the prunes being fed on to the rods 15. The prunes being fed on to the rods 15 are subjected to a rapid succession of impulses urging them forward, and consequently all interspacial areas between the prunes are filled up before the pressure of the continuing supply is carried through to the prunes approaching the tray. The compacting of the layer of prunes is accomplished on the rods 15 and before the fruit is deposited on the tray.

The term fruit as used herein is intended to include nuts and any similar product that may be spread upon a tray for drying or other treatment.

It is to be understood, of course, that while I have herein shown and described but one specific embodiment of the invention, changes in form, construction, and method of assembly and operation may be made within the scope of the appended claim.

I claim:

In a tray loading device, a tray-carrying frame, a transversely disposed support mounted thereover, a fruit slide comprising an assembly of laterally spaced members mounted on the support to extend downwardly into a tray thereunder, a chute having an assembly of laterally spaced members projecting from its discharge end in alternating relationship to the first members and substantially in the plane thereof, a sliding support for the discharge end of the chute, and shaker instrumentalities associated with the receiving end of the chute.

WILLIAM L. GERRANS, Jr.